United States Patent [19]
Proctor et al.

[11] 3,734,296
[45] May 22, 1973

[54] REFRIGERANT DRIER

[75] Inventors: Robert H. Proctor, Richmond; Ralph J. Kombol, Connersville, both of Ind.

[73] Assignee: Philco-Ford Corporation, Philadelphia, Pa.

[22] Filed: May 27, 1971

[21] Appl. No.: 147,350

[52] U.S. Cl..............210/288, 210/484, 210/DIG. 6
[51] Int. Cl. .............................................B01d 27/02
[58] Field of Search........................210/DIG. 6, 266, 210/282, 288, 41, 65, 484; 55/387-389

[56] References Cited

UNITED STATES PATENTS

| | | | |
|---|---|---|---|
| 2,335,901 | 12/1943 | Ayers, Jr. | 55/387 X |
| 2,738,225 | 3/1956 | Meek | 55/387 X |
| 2,260,608 | 10/1941 | Cormack | 210/DIG. 6 |
| 3,310,176 | 3/1967 | Ziherl et al. | 210/DIG. 6 |
| 3,308,957 | 3/1967 | Klein | 210/266 |
| 2,581,684 | 1/1952 | McKenzie | 55/387 |

*Primary Examiner*—John Adee
*Attorney*—Robert D. Sanborn

[57] ABSTRACT

A refrigerant receiver-drier having a sealed desiccant-containing bag made of material through which refrigerant fluid will not flow, but provided with a plurality of apertures small enough to retain the desiccant and large enough to permit free flow of refrigerant into the bag for access to the desiccant contained therein. That portion of the bag which occupies the lower part of the receiver-drier, when the latter is in use, is free of apertures and defines a sump which receives and traps desiccant fines which gravitate to the bottom of the bag.

7 Claims, 3 Drawing Figures

Patented May 22, 1973     3,734,296

INVENTORS
ROBERT H. PROCTOR
RALPH J. KOMBOL
BY
*Carl H. Lynnebrott*
AGENT

REFRIGERANT DRIER

BACKGROUND OF THE INVENTION

Refrigerating systems, particularly automotive air conditioning systems, frequently utilize in their receiver-drier assemblies desiccant bags of woven wool or polypropylene felt. The use of such bags has resulted in problems arising from the fact that loose threads which become detached from the bag, or desiccant fines released therefrom, enter the refrigerating system as contaminants causing trouble in the compressor and expansion valve. Attempts have been made to overcome these difficulties by employing filters of various kinds, but these efforts tend to be costly and frequently are not successful.

SUMMARY OF THE INVENTION

It is the general objective of our invention to overcome these difficulties in very simple manner by the provision of a desiccant bag which is fabricated of a material through which refrigerant will not flow, for example an extruded tube of plastic material, and then to provide the bag with a plurality of apertures through which the refrigerant may flow into contact with the desiccant. In accordance with a more specific aspect of our invention the bag is not apertured until just prior to use, and we contemplate a novel method of providing the apertures.

It is a particular feature of our invention that the portion of the bag to which fines normally gravitate during use serves as a sump to receive and trap such fines, and thus to prevent circulation of the latter within the associated refrigerating system.

In accordance with the invention we fabricate the desiccant bag of plastic material, for example a suitable polypropylene or polyethylene which can be heat sealed, and which can withstand the temperatures (approximately 300° F.) to which it will be exposed in welding of the receiver-drier assembly.

Our invention is also featured by the fact that both end portions of the bag are free of apertures, to obviate the necessity of orienting the bag with respect to the receiver cartridge during assembly of the receiver-drier.

BRIEF DESCRIPTION OF THE DRAWING

In the accompanying drawing.

DETAILED DESCRIPTION OF THE ILLUSTRATED EMBODIMENT

Figures 1, 2, 3:
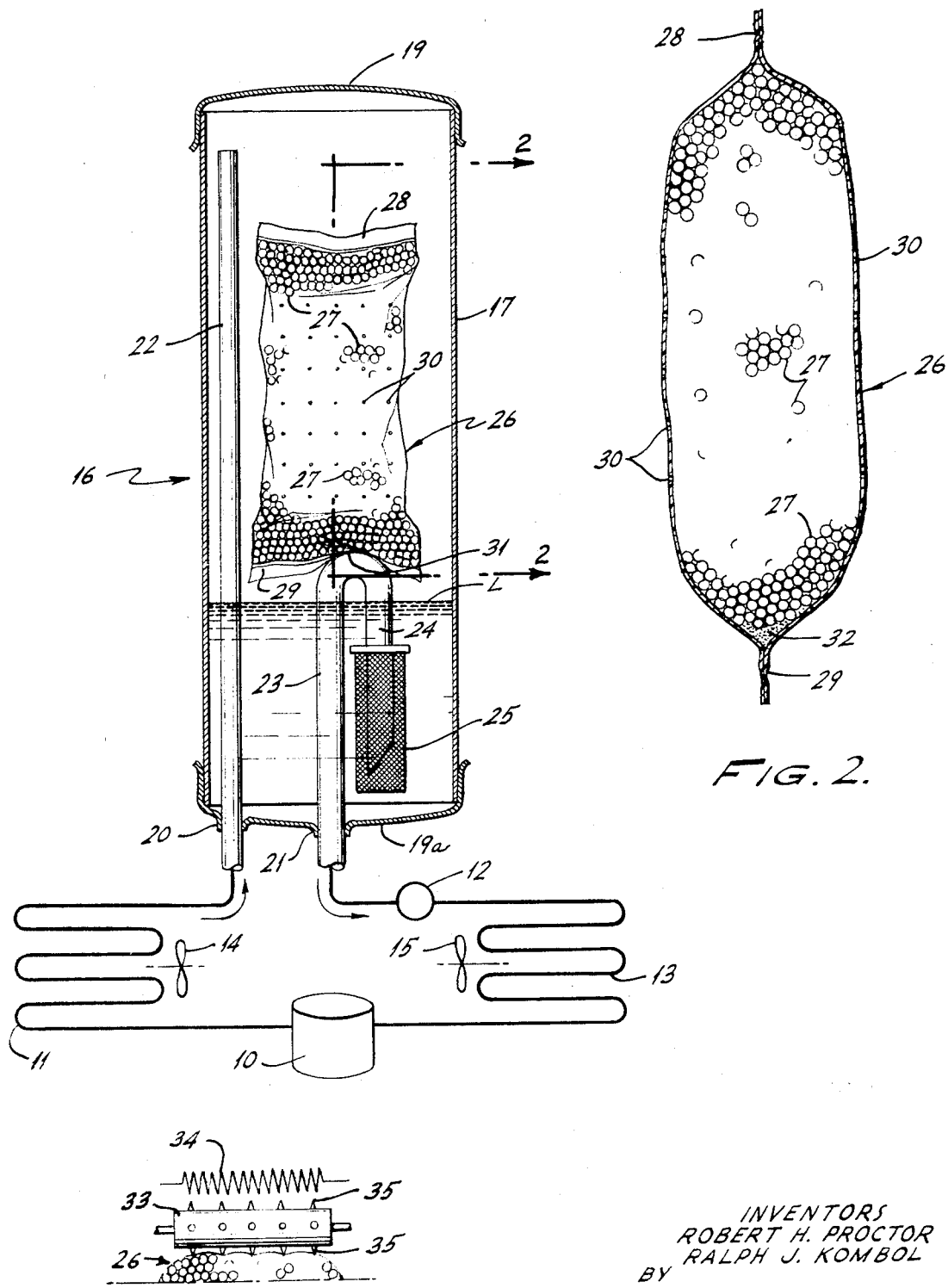
FIG. 1 is a vertical sectional view taken through a cylindrical receiver-drier assembly embodying the invention, and shown diagrammatically in association with the elements of a refrigerating system.
FIG. 2 is a cross-sectional view of the desiccant-containing bag, taken along the line 2—2 applied to FIG. 1, and being an approximately full scale showing of such a bag.
FIG. 3 is a diagrammatic illustration of a method step in accordance with the invention.

First making reference to FIG. 1, there is shown the essential elements of a refrigerating system, for example an automotive air conditioner. The system includes, in series flow circuit, a refrigerant receiver-drier embodying the features of our invention. The refrigerating system includes a motor compressor 10, a condenser 11, a restrictor 12, preferably an expansion valve device, an evaporator 13 and means, including a pair of fans 14 and 15 for moving air in heat exchanger relation with the condenser and evaporator. Interposed between the condenser and the expansion valve is a receiver-drier 16 which comprises a fluid impervious cylinder 17, and upper and lower end caps 19 and 19a, respectively. The lower cap is apertured at 20 and 21 to provide ports in which are received, in fluid-tight relation, an ingress conduit 22 and an egress conduit 23, which latter is provided with a looped and downwardly turned portion 24 capped with a filter screen 25 of suitable material, for example monel metal. Because of the relatively high pressures at which such a system operates, and in accordance with known practice, the cylinder, its end caps and its conduits would normally be fabricated of steel.

In particular accordance with this invention there is provided within a portion of cylinder 17 — the upper portion when the apparatus is in use — a bag 26 containing a suitable desiccant which may, for example, comprise an active crystalline zeolitic molecular sieve of a type now well known in this art. The desiccant takes the form of a great plurality of small individual particles or beads, some of which are shown in the drawing and have been designated by the reference numeral 27. For convenience of illustration, beads have been omitted from portions of the bag. However, it will be understood that, in practice, the bag would be substantially entirely filled with such beads.

As indicated above it is an important feature of our invention that the bag, rather than being woven or of felted materials, is formed of extruded plastic material (e.g., polypropylene or polyethylene). Such materials are substantially impervious to refrigerant fluid, in either the liquid or gaseous state, and from these materials no appreciable shedding of particles will occur. The bag may be heat sealed at its upper and lower ends, as is shown at 28 and 29, respectively. Such heat sealing may readily be accomplished by use of techniques which require no description herein.

In order that the refrigerant may have access to the bag and make contact with the desiccant contained therein, substantial portions, at least two opposed sides of the bag, are provided with apertures 30. These apertures are of a size such as to prevent loss of desiccant therethrough and yet large enough to permit free flow of refrigerant into the bag for access to the desiccant. In a system which has yielded good results, and which has utilized F-12 as a refrigerant, the walls of the extruded plastic tube which comprises the bag have been approximately 4 to 10 mils in thickness and the apertures have been between about one thirty-second and one sixty-fourth inch in diameter.

The bag may be supported within the cylinder in any convenient manner and we have chosen to provide support by the simple expedient of dimensioning the bag 26 so that its lower portion rests upon and is supported by the looped part of the outflow conduit, as appears at 31. This looped portion, in conjunction with the side walls of the cylinder, provides all necessary support.

In normal use of such a receiver-drier, relatively high pressure liquid refrigerant flowing from the condenser 11 enters the receiver-drier through the upstanding ingress conduit 22 which is elevated to insure that the bag 26 will be bathed in liquid refrigerant entering the cylinder 17. During the refrigerating process this liquid refrigerant, which makes many passes over the bag, enters the bag through the apertures 30 and comes into contact with the desiccant to be dried thereby prior to gravity-induced passage out of the bag. The level of liquid in the receiver would vary in accordance with the design and charge of the particular system. In the illustrated system it is shown at a level L, intermediate the top of screen 25 and the lower portion of bag 26.

An important advantage of the use of a plastic bag of the kind contemplated by this invention, is that the fines which are inevitably formed during repeated passes of liquid through the bag, are collected and retained in a lower sump portion of the bag as shown at 32 (FIG. 2). In order that the lower part of the bag may provide such a sump, to receive fines gravitating from upper bag portions, we provide that the lower part of the bag shall be free of apertures. Preferably both ends of the bag are free of apertures in order that either end may constitute the gravity sump, thus imposing no limitation upon the operator in assembling the bag with the cylinder 17.

Preferably, bags are extruded, charged and sealed prior to formation of small apertures through the side walls thereof. If this practice is followed, the bag may be shipped and stored without impairment of its desiccating capability, and the requisite apertures may be provided just prior to use.

There results a nee and advantageous method of dehydrating a refrigerating system, including the steps of: providing a moisture and liquid impervious bag loaded with desiccant, sealing said bag, providing apertures in the loaded and sealed bag just prior to use, and incorporating the bag in a refrigerating system immediately after the provision of the apertures. As shown in FIG. 3, apertures can be provided in very simple manner by passing the bag beneath a roller 33, heated by any suitable means identified at 34, the roller being equipped with needle-like elements 35 which form the apertures 30 by searing the material of which the bag is fabricated. When searing is employed, a clean edge is formed around each aperture and there is virtually no possibility of leaving small detachable particles in contact with the bag.

We claim:

1. A refrigerant drier, comprising, a fluid-impervious, pressure-resistant cartridge having means for ingress of refrigerant thereto and egress of refrigerant therefrom, and a desiccant-containing bag disposed within said cartridge and made of a material through which refrigerant fluid will not flow, said bag being provided with a plurality of apertures small enough to retain the desiccant and large enough to permit free flow of refrigerant into the bag for access to the desiccant contained therein, that portion of said bag which normally defines the lowermost part thereof when said dryer is in use, being free of apertures and defining a sump which receives and traps desiccant fines which gravitate to the bottom of the bag, whereby to prevent circulation of said fines within an associated refrigerating system.

2. A drier in accordance with claim 1, and further characterized in that said bag comprises an extruded tube of plastic material, the ends of which are heat sealed to retain the desiccant.

3. A drier in accordance with claim 2, and in which said plastic material comprises polyethylene.

4. A drier in accordance with claim 2, and in which said plastic material comprises polypropylene.

5. A drier in accordance with claim 1, and in which: the desiccant comprises beads of a material comprising an active crystalline zeolitic molecular sieve; and said apertures are between about one thirty-second and one sixty-fourth inch in diameter.

6. In an air conditioning system of the kind including a receiver-drier assembly disposed, in the fluid flow circuit, between the heat exchangers of such a system, and normally maintained in an upright position in which one portion of said receiver-drier occupies a lower position than other portions thereof, a desiccant-containing bag disposed and supported within said receiver-drier, said bag comprising a sleeve-like member having sealed ends one of which occupies an upper part of said receiver-drier and the other of which is disposed toward the lower portion of the latter, said bag being fabricated of material substantially impervious to flow of refrigerant fluid therethrough and being provided with a plurality of apertures to accommodate such flow, in order that the refrigerant fluid may come in contact with the desiccant within the bag, at least said lower end of said bag being free of apertures and constituting a sump to receive desiccant fines which form during normal use of the refrigerant dryer and gravitate toward said lower end to be trapped therein.

7. A system in accordance with claim 6, in which said assembly comprises a cylindrical container enclosing said bag and having refrigerant ingress and egress conduits one of which is configured and disposed to support said bag within said container.

* * * * *